US012561887B2

(12) United States Patent
Bergland

(10) Patent No.: US 12,561,887 B2
(45) Date of Patent: Feb. 24, 2026

(54) MAPPING TEXTURE POINT SAMPLES TO LANES OF A FILTER PIPELINE

(71) Applicant: Apple Inc., Cupertino, CA (US)

(72) Inventor: Tyson J. Bergland, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 149 days.

(21) Appl. No.: 18/653,576

(22) Filed: May 2, 2024

(65) Prior Publication Data

US 2025/0342645 A1      Nov. 6, 2025

(51) Int. Cl.
*G06T 15/04* (2011.01)
*G06T 1/20* (2006.01)

(52) U.S. Cl.
CPC .............. *G06T 15/04* (2013.01); *G06T 1/20* (2013.01); *G06T 2210/36* (2013.01)

(58) Field of Classification Search
USPC ......................................................... 345/582
See application file for complete search history.

(56) References Cited

U.S. PATENT DOCUMENTS

| | | | |
|---|---|---|---|
| 10,013,735 B2 | 7/2018 | Yun et al. | |
| 11,379,944 B2 | 7/2022 | Fetterman et al. | |
| 2017/0228919 A1* | 8/2017 | Burns ...................... | G06T 15/06 |
| 2021/0104009 A1* | 4/2021 | Li ........................... | G06T 1/20 |
| 2022/0180590 A1 | 6/2022 | Seiler | |

| | | | |
|---|---|---|---|
| 2022/0207110 A1 | 6/2022 | Fenney | |
| 2022/0327759 A1 | 10/2022 | Wu et al. | |
| 2023/0050686 A1 | 2/2023 | King | |

FOREIGN PATENT DOCUMENTS

| | | |
|---|---|---|
| CN | 106683171 B | 5/2017 |
| CN | 109104611 A | 12/2018 |
| CN | 106204412 B | 3/2019 |
| CN | 110930493 A | 3/2020 |

\* cited by examiner

*Primary Examiner* — James A Thompson
*Assistant Examiner* — Kim Thanh T Tran
(74) *Attorney, Agent, or Firm* — Kowert, Hood, Munyon, Rankin & Goetzel, P.C.; Michael B. Davis; Dean M. Munyon

(57)        ABSTRACT

Techniques are disclosed relating to texture sampling, e.g., in graphics processors. In some embodiments, a device includes processor circuitry (e.g., shader pipelines) configured to execute graphics programs and multiple sample pipelines. A given sample pipeline may be configured to, for a multi-texel sample operation specified by the processor circuitry, access texel data for multiple texels forming a first shape in a texture (e.g., a 2×2 square) and perform one or more filter operations to generate a result for the multi-texel sample operation. Point sample control circuitry may be configured to detect that multiple point sample operations, specified by the processor circuitry, access a set of texels having the first shape. The point sample control circuitry may assign the multiple point sample operations to one of the sample pipelines for performance in parallel by the sample pipeline and provide results of the assigned multiple point sample operations to the processor circuitry.

20 Claims, 8 Drawing Sheets

Access, by a sample pipeline of a computing system for a multi-texel sample operation, texel data for multiple texels forming a first shape in a texture
*510*

Perform one or more filter operations to generate a result for the multi-texel sample operation
*520*

Detect that that multiple point sample operations access a set of texels having the first shape
*530*

Assign, in response to the detection, the multiple point sample operations to one of the sample pipelines for performance in parallel by the sample pipeline
*540*

Provide results of the assigned multiple point sample operations to shader processor circuitry of the computing system
*550*

Vertex Data

Processing
Flow 100

Graphics
Unit
150

*Example pipeline in texture processing unit*

*Example pipeline with faster point sampling*

*Up to N point sample operations*

*Sample operation that uses N texels (e.g., bilinear operation)*

*Parallel sample pipelines 205*

Shape check
220

Filter stage(s)
206

*Sample/filter pipeline*
210

*Sample/filter pipeline*
210

*Filtered sample result*

*Up to N sample results*

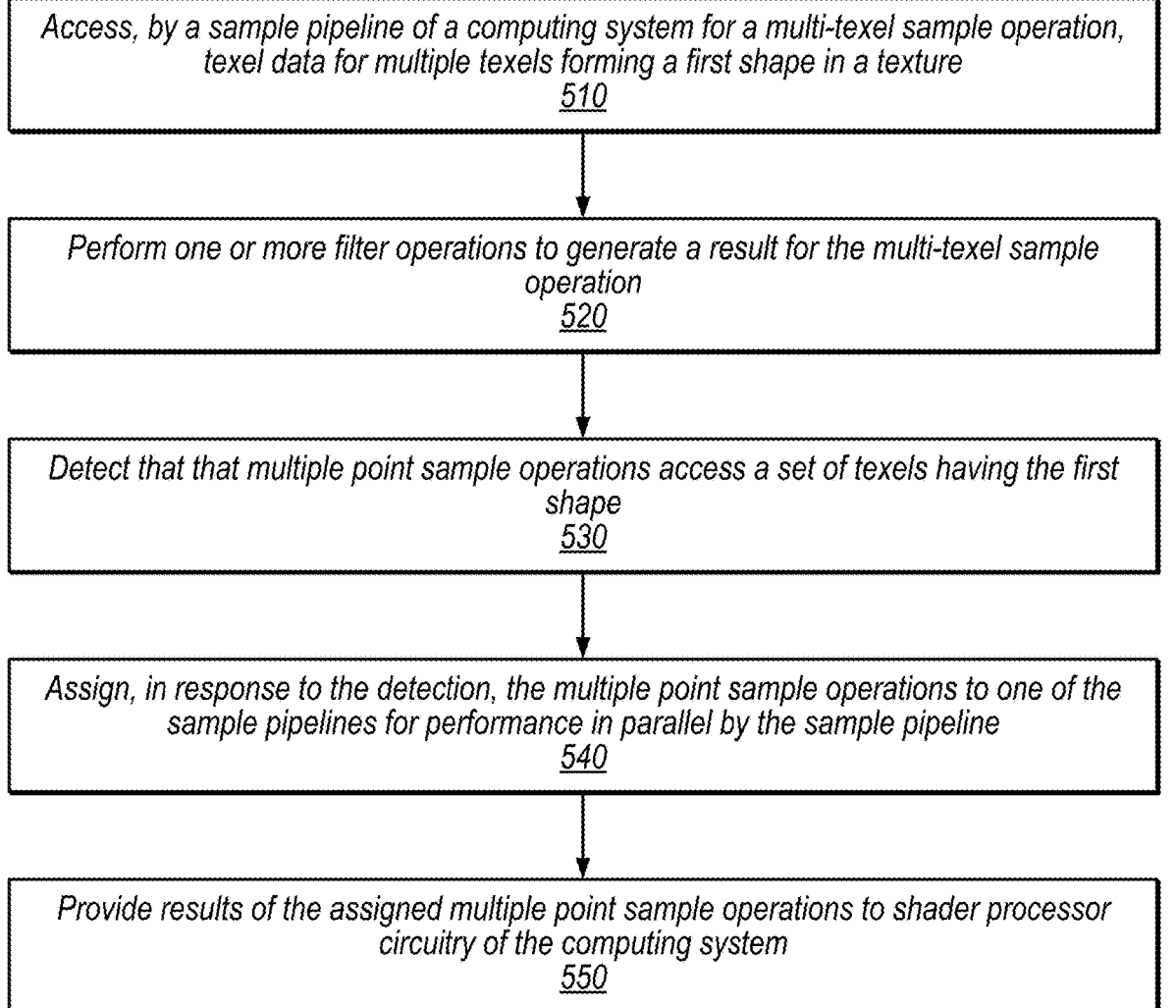

*Access, by a sample pipeline of a computing system for a multi-texel sample operation, texel data for multiple texels forming a first shape in a texture*
*510*

*Perform one or more filter operations to generate a result for the multi-texel sample operation*
*520*

*Detect that that multiple point sample operations access a set of texels having the first shape*
*530*

*Assign, in response to the detection, the multiple point sample operations to one of the sample pipelines for performance in parallel by the sample pipeline*
*540*

*Provide results of the assigned multiple point sample operations to shader processor circuitry of the computing system*
*550*

*FIG. 5*

MAPPING TEXTURE POINT SAMPLES TO LANES OF A FILTER PIPELINE

BACKGROUND

Technical Field

This disclosure relates generally to graphics processors and more particularly to texture sampling.

Description of Related Art

Graphics processors typically include texture processing pipelines configured to sample textures as part of determining pixel attributes for a frame of graphics data. Texture pipelines often include filtering hardware, e.g., to determine sample values based on multiple texels near a sampling location. Bilinear or bicubic filtering, for example, may help blur transitions between colors in a sampled texture, relative to point sampling (in which the sample values may be based on a single texel nearest the sample location). Therefore, sampling hardware may include dedicated sets of sample pipelines and associated filter circuitry, e.g., for four samples for bilinear sampling. Many workloads include a substantial number of point sampling operations, however, which may execute at the same rate as bilinear sampling operations on sampling hardware configured for bilinear sampling.

BRIEF DESCRIPTION OF DRAWINGS

FIG. 5 is a flow diagram illustrating an example method, according to some embodiments.

DETAILED DESCRIPTION

As discussed above, traditionally point samples may be performed at similar rates to bilinear samples on sample/filter pipelines configured for filter operations (e.g., bilinear filtering). In contrast, in disclosed embodiments certain sets of point samples are grouped to utilize multiple lanes of a sample/filter pipeline, which may advantageously increase hardware utilization and improve throughput for point samples.

For example, when point samples for multiple threads (where the threads may perform operations for different pixels) can be coalesced into a 2×2 or 1×4 shape (e.g., adjacent threads in a quad from the shader processor form a 1×4 or 2×2 shape in texture space), they are mapped to the same thread lane (e.g., to multiple lanes of a bilinear or bicubic sample/filter pipeline), in some embodiments. The sample/filter pipeline may treat the coalesced pixels as a regular texture quad and then disable filtering on the backend. Control circuitry may then serialize the results back into the original threads. This may allow the point samples to run at up to 4× the traditional rate on bilinear filter pipelines, for example, without dedicated pipelines for point samples. Further, disclosed techniques may improve cache performance and reduce power consumption, e.g., due to cache locality of texture data corresponding to the shape.

The control circuitry may also check for certain conditions before enabling these fast point sampling techniques. For example, the control circuitry may check for a level-of-detail (LOD) not being in gradient mode, that the max aniso is 1×, etc. in conjunction with checking the shape of the multiple point samples. Sets of point samples that do not meet the shape(s) or conditions may be separately processed using different sample/filter pipelines similarly to traditional techniques.

In some embodiments, control circuitry is configured to detect situations where a threshold number of sample operations are included in a graphics program (e.g., a long sequence of point samples) and may power gate one or more sample pipelines in this scenario (e.g., because the point samples can be grouped for fast point sampling and processed with satisfactory performance without using all of the available sample pipelines).

Graphics Processing Overview

Figure 1A:
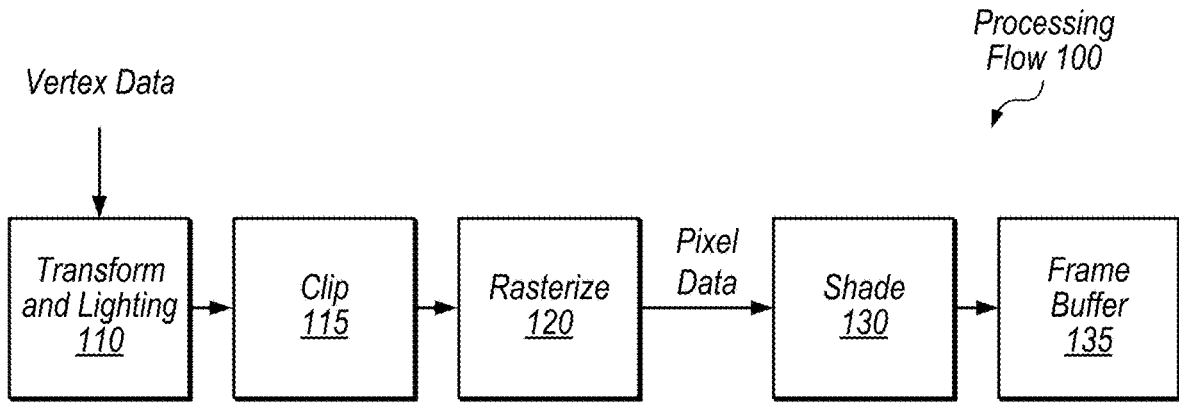
FIG. 1A is a diagram illustrating an overview of example graphics processing operations, according to some embodiments.

Referring to FIG. 1A, a flow diagram illustrating an example processing flow 100 for processing graphics data is shown. In some embodiments, transform and lighting procedure 110 may involve processing lighting information for vertices received from an application based on defined light source locations, reflectance, etc., assembling the vertices into polygons (e.g., triangles), and transforming the polygons to the correct size and orientation based on position in a three-dimensional space. Clip procedure 115 may involve discarding polygons or vertices that fall outside of a viewable area. In some embodiments, geometry processing may utilize object shaders and mesh shaders for flexibility and efficient processing prior to rasterization. Rasterize procedure 120 may involve defining fragments within each polygon and assigning initial color values for each fragment, e.g., based on texture coordinates of the vertices of the polygon. Fragments may specify attributes for pixels which they overlap, but the actual pixel attributes may be determined based on combining multiple fragments (e.g., in a frame buffer), ignoring one or more fragments (e.g., if they are covered by other objects), or both. Shade procedure 130 may involve altering pixel components based on lighting, shadows, bump mapping, translucency, etc. Shaded pixels may be assembled in a frame buffer 135. Modern GPUs typically include programmable shaders that allow customization of shading and other processing procedures by application developers. Thus, in various embodiments, the example elements of FIG. 1A may be performed in various orders, performed in parallel, or omitted. Additional processing procedures may also be implemented.

Figure 1B:
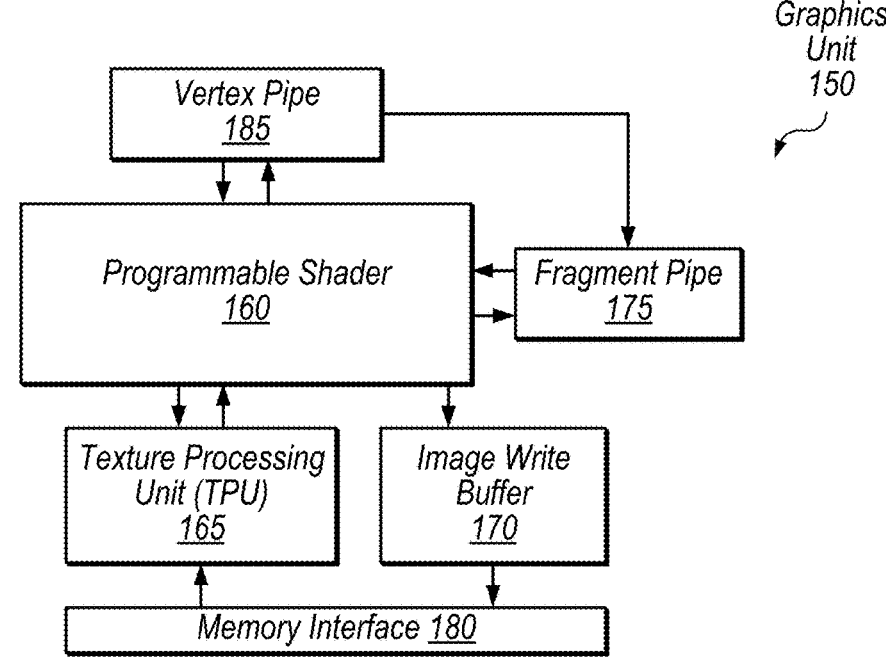
FIG. 1B is a block diagram illustrating an example graphics unit, according to some embodiments.

Referring now to FIG. 1B, a simplified block diagram illustrating a graphics unit 150 is shown, according to some embodiments. In the illustrated embodiment, graphics unit 150 includes programmable shader 160, vertex pipe 185, fragment pipe 175, texture processing unit (TPU) 165, image write buffer 170, and memory interface 180. In some embodiments, graphics unit 150 is configured to process both vertex and fragment data using programmable shader 160, which may be configured to process graphics data in parallel using multiple execution pipelines or instances.

Vertex pipe 185, in the illustrated embodiment, may include various fixed-function hardware configured to process vertex data. Vertex pipe 185 may be configured to communicate with programmable shader 160 in order to coordinate vertex processing. In the illustrated embodiment, vertex pipe 185 is configured to send processed data to fragment pipe 175 or programmable shader 160 for further processing.

Fragment pipe 175, in the illustrated embodiment, may include various fixed-function hardware configured to process pixel data. Fragment pipe 175 may be configured to communicate with programmable shader 160 in order to coordinate fragment processing. Fragment pipe 175 may be configured to perform rasterization on polygons from vertex pipe 185 or programmable shader 160 to generate fragment data. Vertex pipe 185 and fragment pipe 175 may be coupled to memory interface 180 (coupling not shown) in order to access graphics data.

Programmable shader 160, in the illustrated embodiment, is configured to receive vertex data from vertex pipe 185 and fragment data from fragment pipe 175 and TPU 165. Programmable shader 160 may be configured to perform vertex processing tasks on vertex data which may include various transformations and adjustments of vertex data. Programmable shader 160, in the illustrated embodiment, is also configured to perform fragment processing tasks on pixel data such as texturing and shading, for example. Programmable shader 160 may include multiple sets of multiple execution pipelines for processing data in parallel.

In some embodiments, programmable shader includes pipelines configured to execute one or more different SIMD groups in parallel. Each pipeline may include various stages configured to perform operations in a given clock cycle, such as fetch, decode, issue, execute, etc. The concept of a processor "pipeline" is well understood, and refers to the concept of splitting the "work" a processor performs on instructions into multiple stages. In some embodiments, instruction decode, dispatch, execution (i.e., performance), and retirement may be examples of different pipeline stages. Many different pipeline architectures are possible with varying orderings of elements/portions. Various pipeline stages perform such steps on an instruction during one or more processor clock cycles, then pass the instruction or operations associated with the instruction on to other stages for further processing.

The term "SIMD group" is intended to be interpreted according to its well-understood meaning, which includes a set of threads for which processing hardware processes the same instruction in parallel using different input data for the different threads. SIMD groups may also be referred to as SIMT (single-instruction, multiple-thread) groups, single instruction parallel thread (SIPT), or lane-stacked threads. Various types of computer processors may include sets of pipelines configured to execute SIMD instructions. For example, graphics processors often include programmable shader cores that are configured to execute instructions for a set of related threads in a SIMD fashion. Other examples of names that may be used for a SIMD group include: a wavefront, a clique, or a warp. A SIMD group may be a part of a larger threadgroup of threads that execute the same program, which may be broken up into a number of SIMD groups (within which threads may execute in lockstep) based on the parallel processing capabilities of a computer. In some embodiments, each thread is assigned to a hardware pipeline (which may be referred to as a "lane") that fetches operands for that thread and performs the specified operations in parallel with other pipelines for the set of threads. Note that processors may have a large number of pipelines such that multiple separate SIMD groups may also execute in parallel. In some embodiments, each thread has private operand storage, e.g., in a register file. Thus, a read of a particular register from the register file may provide the version of the register for each thread in a SIMD group.

As used herein, the term "thread" includes its well-understood meaning in the art and refers to sequence of program instructions that can be scheduled for execution independently of other threads. Multiple threads may be included in a SIMD group to execute in lock-step. Multiple threads may be included in a task or process (which may correspond to a computer program). Threads of a given task may or may not share resources such as registers and memory. Thus, context switches may or may not be performed when switching between threads of the same task.

In some embodiments, multiple programmable shader units 160 are included in a GPU. In these embodiments, global control circuitry may assign work to the different sub-portions of the GPU which may in turn assign work to shader cores to be processed by shader pipelines.

TPU 165, in the illustrated embodiment, is configured to schedule fragment processing tasks from programmable shader 160. In some embodiments, TPU 165 is configured to pre-fetch texture data and assign initial colors to fragments for further processing by programmable shader 160 (e.g., via memory interface 180). TPU 165 may be configured to provide fragment components in normalized integer formats or floating-point formats, for example. In some embodiments, TPU 165 is configured to provide fragments in groups of four (a "fragment quad") in a 2×2 format to be processed by a group of four execution pipelines in programmable shader 160.

Image write buffer 170, in some embodiments, is configured to store processed tiles of an image and may perform operations to a rendered image before it is transferred for display or to memory for storage. In some embodiments, graphics unit 150 is configured to perform tile-based deferred rendering (TBDR). In tile-based rendering, different portions of the screen space (e.g., squares or rectangles of pixels) may be processed separately. Memory interface 180 may facilitate communications with one or more of various memory hierarchies in various embodiments.

As discussed above, graphics processors typically include specialized circuitry configured to perform certain graphics processing operations requested by a computing system. This may include fixed-function vertex processing circuitry, pixel processing circuitry, or texture sampling circuitry, for example. Graphics processors may also execute non-graphics compute tasks that may use GPU shader cores but may not use fixed-function graphics hardware. As one example, machine learning workloads (which may include inference, training, or both) are often assigned to GPUs because of their parallel processing capabilities. Thus, compute kernels executed by the GPU may include program instructions that specify machine learning tasks such as implementing neural network layers or other aspects of machine learning models to be executed by GPU shaders. In some scenarios, non-graphics workloads may also utilize specialized graphics circuitry, e.g., for a different purpose than originally intended.

Further, various circuitry and techniques discussed herein with reference to graphics processors may be implemented in other types of processors in other embodiments. Other types of processors may include general-purpose processors such as CPUs or machine learning or artificial intelligence accelerators with specialized parallel processing capabilities. These other types of processors may not be configured to execute graphics instructions or perform graphics operations. For example, other types of processors may not include fixed-function hardware that is included in typical GPUs. Machine learning accelerators may include specialized hardware for certain operations such as implementing neural network layers or other aspects of machine learning models. Speaking generally, there may be design tradeoffs between the memory requirements, computation capabilities, power consumption, and programmability of machine learning accelerators. Therefore, different implementations may focus on different performance goals. Developers may select from among multiple potential hardware targets for a given machine learning application, e.g., from among generic processors, GPUs, and different specialized machine learning accelerators.

Overview of Coalescing Techniques for Point Sample Operations

Figures 2A, 2B:
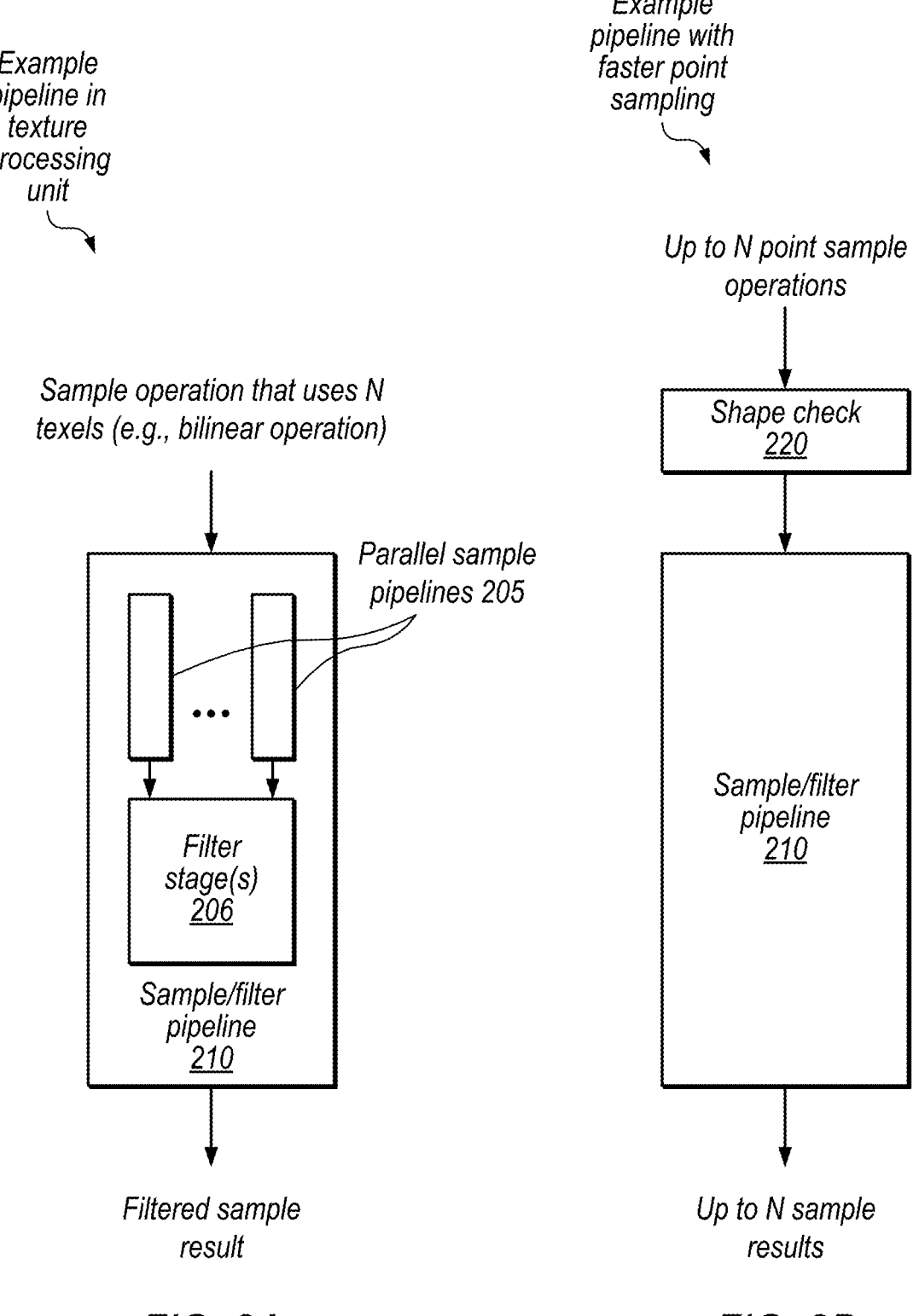
FIG. 2A is a block diagram illustrating an example sample/filter pipeline that supports a sample operation on N texels to generate a filtered sample result, according to some embodiments.
FIG. 2B is a block diagram illustrating example shape check circuitry for up to N point sample operations for potential mapping to the sample/filter pipeline, according to some embodiments.

FIG. 2A is a block diagram illustrating an example sample/filter pipeline, according to some embodiments. Generally, texture sampling accesses an image composed of texels and referred to as a texture. To determine attributes of pixels in a graphics scene, shader 160 may map parts of a texture to an object in the image. A sample operation for a given pixel indicates the texture coordinates at which texel(s) are mapped to the pixel. TPU 165 determines one or more texels nearest to the indicated coordinates and provides texel attributes of those texels, which shader 160 then uses to determine attributes of the pixel (e.g., color components, alpha, etc.).

A point sample may use texel attributes from only the nearest texel to the sample location. Other sample techniques may use multiple texels and perform a filter operation to determine sample output attributes. For example, bilinear samples may access four nearest texels to the sample point and bicubic samples may access sixteen texels.

TPU 165 may include specialized pipelines, e.g., configured to accelerate bilinear sample operations. Therefore, a given pipeline 210 may correspond to a pixel lane and be configured to perform a bilinear sample operation. As shown, in the illustrated example, the overall pipeline 210 includes N parallel sample pipelines 205 (which may be referred to as sample lanes) and filter stage(s) 206. For bilinear implementations, pipeline 210 may include four parallel pipelines, for example. These details are included for purposes of explanation, but greater or lesser numbers of parallel pipelines may be implemented in other embodiments.

In the illustrated embodiment, sample/filter pipeline 210 receives a sample operation (e.g., based on a sample instruction executed by a SIMD program executed by programmable shader 160), processes the operation using one or more sample stages and one or more filter stages, and generates a filtered sample result after a number of clock cycles. As shown, the pipeline 210 may be included in TPU 165. The operation may be a bilinear sample operation, for example, for which the pipeline 210 may sample four texels and perform bilinear filtering to generate a sample result.

A given pipeline 210 may include front-end circuitry configured to receive coordinates for a sample operation, convert or adjust the coordinates if needed, perform level of detail and anisotropic operations, etc. A given sample pipeline 205 may be configured to determine a set of one or more texels based on received coordinates and determine addresses of those texels. The pipeline 205 may then load the texel data for those texel(s) (e.g., from a texture cache or from another level of a cache/memory hierarchy if there is a miss in the texture cache).

Filter stage(s) 206 may then operate on the loaded texture data to generate a filtered sample result. For example, for a bilinear filter operation, the filter stages 206 may include ALU circuitry configured to perform bilinear interpolation operations (e.g., using repeated linear interpolation or weighted average operations, which may use multiplier, adder, and reciprocal circuitry).

The concept of a processor "pipeline" is well understood and refers to the concept of splitting the "work" a processor performs on instructions into multiple stages. Many different pipeline architectures are possible with varying orderings of elements/portions. Various pipeline stages perform processing steps on an instruction during one or more processor clock cycles, then pass the instruction or operations associated with the instruction on to other stages for further processing.

FIG. 2B is a block diagram illustrating example shape check circuitry for a sample/filter pipeline, according to some embodiments. The sample/filter pipeline 210 of FIG. 2B may be configured as discussed above with reference to FIG. 2A.

In this illustrated example, shape check circuitry 220 is configured to receive up to N point sample operations and check whether the operations match one or more shapes. Traditionally, different point sample operations would be sent to different sample/filter pipelines 210. Using this approach, however, all but one of the parallel sample pipelines 205 may be idle for the point sample operation. In contrast, in disclosed embodiments if the point sample operations match a pre-determined shape, shape check circuitry 220 is configured to group the point samples and assign them to the same pipeline 210 (e.g., one point sample operation to a given sample pipeline 205). If not, shape check circuitry 220 may send the point samples to different pipelines 210 (other pipelines not explicitly shown).

As shown, sample/filter pipeline 210 is configured to process the up to N point sample operations and output up to N sample results. This may include performing sample operations in parallel (similarly to a bilinear operation) but disabling filter circuitry to provide the four nearest-texel results without filter processing. Control circuitry may then assign point sample results to the correct thread on the backend of the pipeline. This may provide substantially faster point sampling than assigning the sample operations to different pipelines 210, may exploit cache locality of texture data for groups of point samples, and may therefore improve performance, reduce power consumption, or both. Shape check circuitry 220 may not interfere with non-point samples (e.g., bilinear samples) which may be processed by a given pipeline 210 as discussed with reference to FIG. 2A.

Detailed Example Implementation

Figure 3:
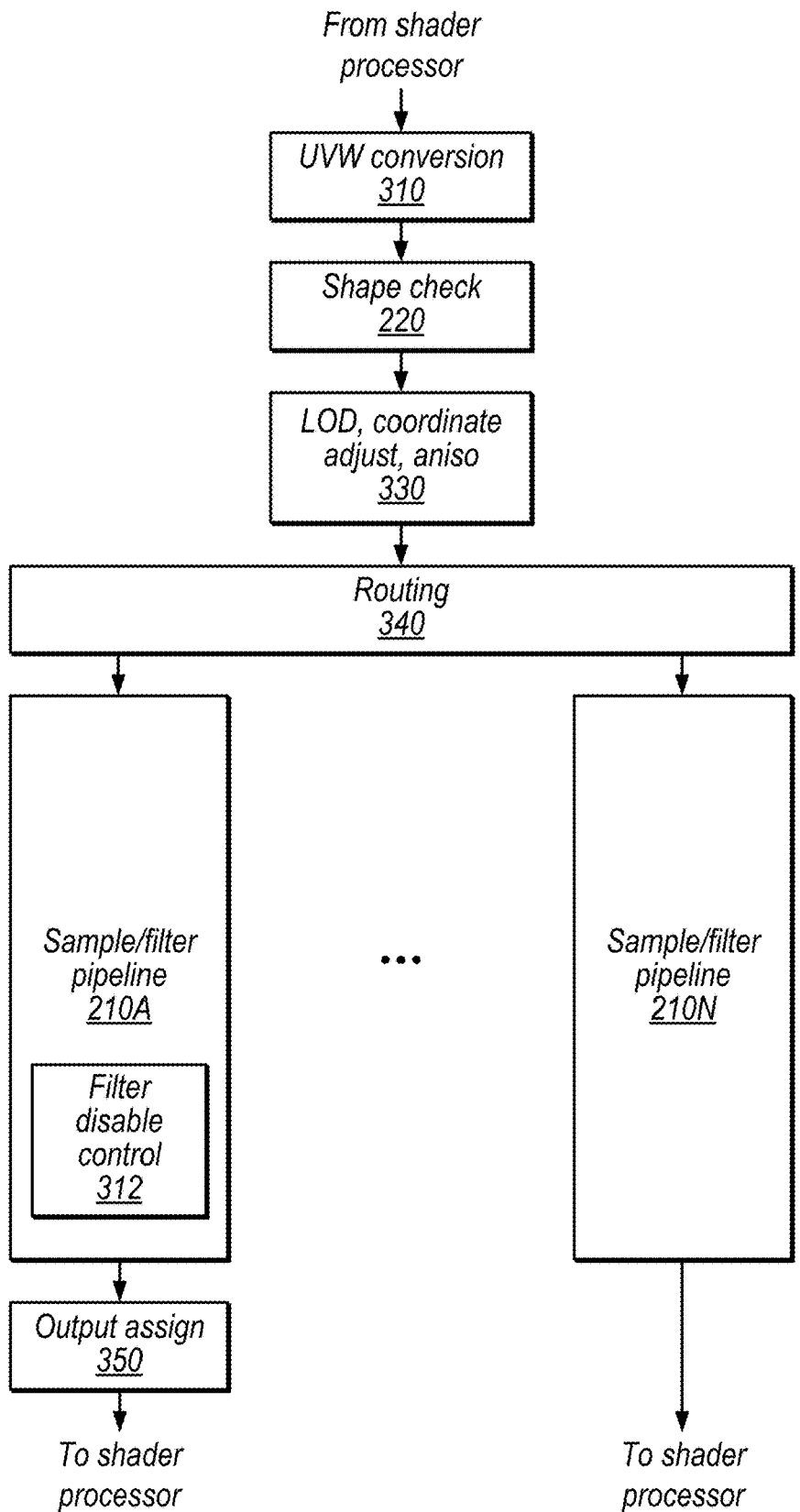
FIG. 3 is a block diagram illustrating a more detailed example of texture processing circuitry configured to map point samples to sample lanes, according to some embodiments.

FIG. 3 is a block diagram illustrating a more detailed example pipeline configured to perform a filter and sample operation or multiple parallel point sample operations, according to some embodiments. In the illustrated example, the processor includes UVW conversion circuitry 310, shape check circuitry 220, level-of-detail (LOD)/coordinate adjust/anisotropic (aniso) circuitry 330, routing circuitry 340, sample filter pipelines 210A-210N, and output assign circuitry 350.

UVW conversion circuitry 310, in some embodiments, is configured to calculate non-normalized UVW coordinates for incoming pixels (which may correspond to the number of threads in a SIMD group, for example). Note that UVW conversion 310 may include additional UVW converters relative to traditional techniques in order to handle point samples according to disclosed techniques. This may provide a larger number of threads to a set of sample pipelines in a given cycle, relative to traditional techniques, when performing point sample operations.

Shape check circuitry 220, in some embodiments is configured to check a group of threads (e.g., a quad) to determine whether they form one or more pre-determined shapes in texture space. For example, circuitry 220 may check that deltas between threads are 1 or less in texture UV space. In some embodiments, shape check circuitry 220 operates on a set of adjacent threads in a SIMD group. Shape check circuitry may examine separate sets of adjacent threads in a SIMD group (e.g., threads 0-3, 4-7, and so on) or may use a sliding window or other techniques to examine additional threads to potentially coalesce into a pre-determined shape. In some embodiments, a compiler may provide hints regarding shapes or regarding which subsets of threads should be examined for potential access shapes. Example shapes in the bilinear filter context include 2×2, 4×1, 2×1 (e.g., if a group of four threads with the correct shape cannot be found), 1×4, etc. For other forms of filtering (e.g., bicubic) the pre-determined shapes may involve larger maximum numbers of threads to be grouped together (e.g., if forming a 4×4 shape, 1×16 shape, 2×8 shape, etc. in texture space).

Note that shape check circuitry 220 may also check various additional conditions for coalescing point samples. For example, in some embodiments circuitry 220 is configured to check that shadow compare is not enabled, max aniso is 1×, and LOD mode is not gradient. If those conditions are not satisfied, shape check circuitry 220 may determine not to coalesce point samples.

Threads that cannot be coalesced with other threads due to not finding an appropriate shape may be individually provided to different sample filter pipelines 210 (or in pairs when a full quad cannot be coalesced, etc.). Shape check circuitry 220 may also determine not to coalesce any threads of a SIMD group if a threshold number of threads cannot be coalesced, in some embodiments.

LOD, coordinate adjust, and aniso circuitry 330, in some embodiments, is configured to determine the level of detail for a sample, adjust coordinates in certain scenarios, perform aniso computations, and potentially other operations to prepare for sample operations by the pipelines 210. For MIP mapping situations, circuitry 330, circuitry 220, or both may project UVW coordinates onto a coarse MIP map to check that the threads remain adjacent in the smaller map.

Routing circuitry 340, in some embodiments, is configured to route point sample operations (potentially including some coalesced operations and some not within a given SIMD group), to sample/filter pipelines 210. For example, in bilinear embodiments, routing circuitry 340 may send four coalesced point sample operations with a 2×2 shape in texture space to pipeline 210 and a single point sample operation that did not coalesce to pipeline 210N.

A given sample filter pipelines 210, in the illustrated embodiment, includes filter disable control circuitry 312. Circuitry 312 is configured to disable one or more filter stages of the overall pipeline 210, e.g., in order to provide the results of the point samples to output assign circuitry 350 without filtering. Circuitry 312 may also control conversion circuitry (e.g., convert from RGBA8 to unorm8 or float16) to provide data to the shader. Similarly to UVW conversion 310, a given pipeline 210 may implement additional converter circuits relative to traditional techniques, to handle a larger throughput of point sample operations. Circuitry 312 may also perform rate matching operations, e.g., to match the rate of sample operations with operations by programmable shader 160.

Circuitry 312 may also be configured to swizzle output values, e.g., in embodiments that tile/swizzle the texture in memory such that a square region of a tile is in the same spatial location in memory (e.g., in contrast to linear striding), which may advantageously improve cache efficiency. Generally, disclosed techniques may take advantage of various optimizations that are specialized for a particular type of filtered sampling (e.g., bilinear) that also apply to point samples with a similar shape in texture space. Therefore, disclosed techniques may reduce power consumption due to those optimizations in addition to improving performance by increasing the rate of point sample operations.

Output assign circuitry 350, in some embodiments, is configured to assign outputs of the sample operations to the original threads. This may serialize the parallel outputs from the parallel pipelines within a sample/filter pipeline. Note that an instance of circuitry 350 may be included in each pipeline 210, or only a subset (e.g., if only a subset of available pipelines are used when point samples can be coalesced).

Example Power Control Techniques

Figure 4:
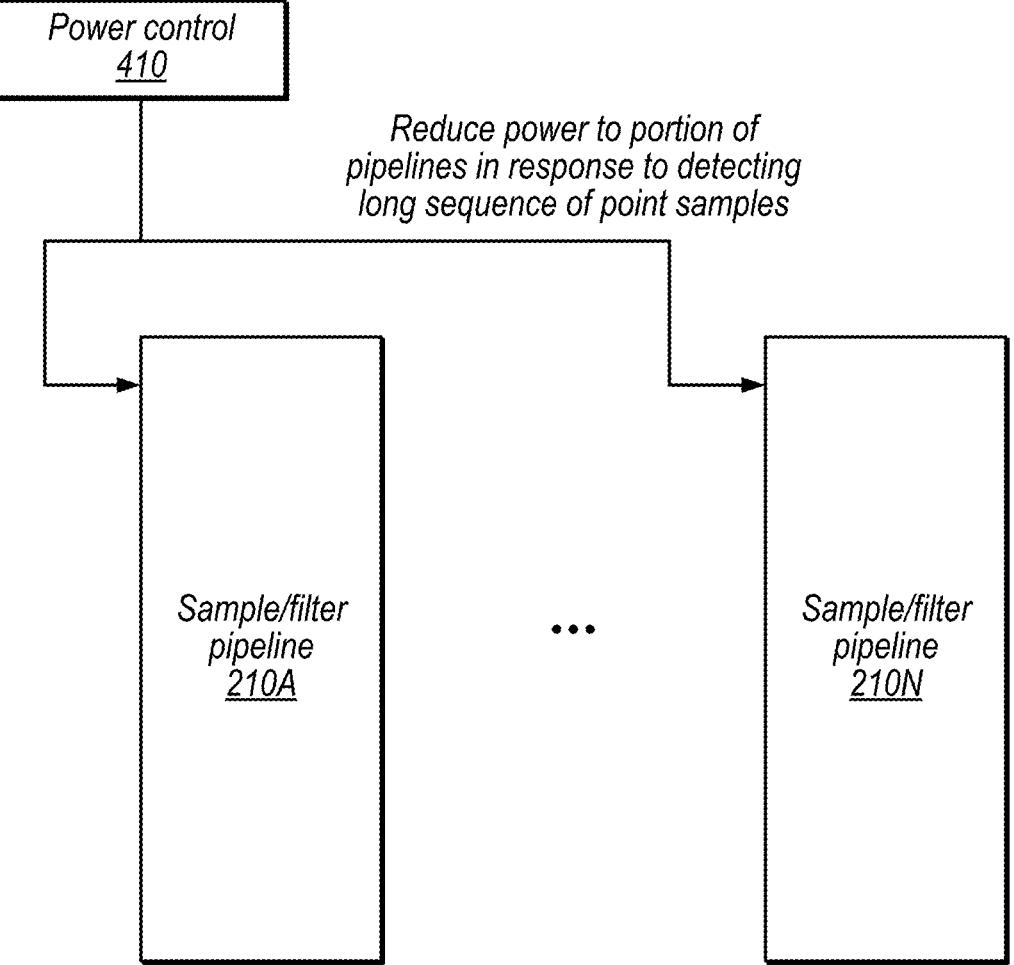
FIG. 4 is a block diagram illustrating power control circuitry configured to reduce power a subset of sample/filter pipeline in response to a long sequence of point samples, according to some embodiments.

FIG. 4 is a block diagram illustrating example power control techniques, according to some embodiments. In the illustrated example, the processor includes power control circuitry 410 configured to control power to different sample/filter pipelines 210.

Power control circuitry 410, in some embodiments, is configured to reduce the power state of a subset of the sample/filter pipelines in certain scenarios. For example, in response to a signal indicating a long sequence of point samples, power control circuitry 410 may determine to power gate one or more sample/filter pipelines 210 that likely will not be needed because a subset of the pipelines 210 are able to provide sufficient throughput for the point samples once many of them have been coalesced. This may advantageously reduce overall power consumption.

The processor may detect the long sequence of point sample based on a compiler hint, based on analysis of instructions in an instruction buffer, or some combination thereof, for example.

Example Method

FIG. 5 is a flow diagram illustrating an example method for coalescing point sample operations, according to some embodiments. The method shown in FIG. 5 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 510, in the illustrated embodiment, a computing system (e.g., sample pipelines of a sample filter pipeline 210) accesses texel data for multiple texels forming a first shape in a texture.

At 520, in the illustrated embodiment, the computing system performs one or more filter operations to generate a result for the multi-texel sample operation.

At 530, in the illustrated embodiment, the computing system detects that that multiple point sample operations access a set of texels having the first shape.

At 540, in the illustrated embodiment, the computing system assigns, in response to the detection, the multiple point sample operations to one of the sample pipelines for performance in parallel by the sample pipeline.

In some embodiments, a given pipeline includes multiple parallel sample pipelines configured to access texture data in parallel and filter circuitry configured to perform the one or more filter operations on results from the parallel sample pipelines. The point sample control circuitry may disable filter circuitry of the one of the pipelines in conjunction with the assignment.

At 550, in the illustrated embodiment, the computing system provides results of the assigned multiple point sample operations to shader processor circuitry of the computing system.

According to one example, the first shape is a 2×2 quad of pixels, the one or more filter operations include a bilinear filter operation, and the point sample control circuitry is configured to assign four point sample operations to the one of the pipelines. According to another example, the first shape is a line of multiple adjacent pixels. According to another example, the first shape is a 4×4 group of pixels and the one or more filter operations include a bicubic filter operation.

In some embodiments, the point sample control circuitry is further configured to, for a different set of multiple point sample operations that do not access a set of texels having the first shape, assign the point sample operations of the different set to different pipelines.

In some embodiments, a given pipeline is configured to exploit cache locality for texel data corresponding to the first shape. For example, the pipeline may perform one or more swizzle operations on results of the assigned multiple point sample operations.

In some embodiments, the multiple point sample operations are from different threads executed by the processor circuitry and the point sample control circuitry is configured to provide a given result of the assigned multiple point sample operations to the corresponding thread.

In some embodiments, the point sample control circuitry is further configured to determine that a threshold number of point sample operations are included in an executed graphics program and in response to the determination, power gate a proper subset of the multiple pipelines.

In some embodiments, the point sample control circuitry is configured to assign the multiple point sample operations to one of the pipelines based on confirming one or more coalesce conditions, including a level of detail condition and an anisotropic condition.

Example Device

Figure 6:
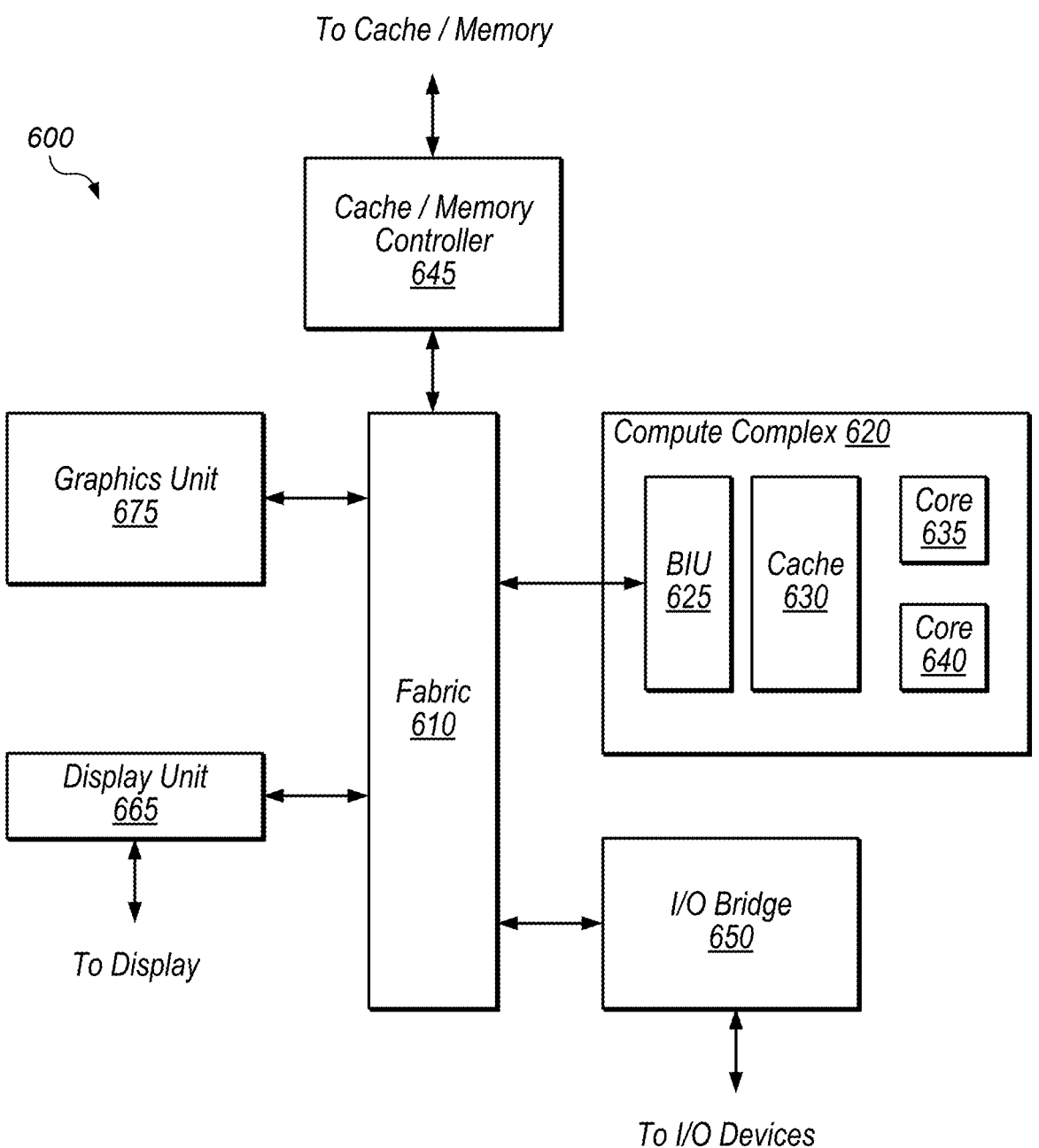
FIG. 6 is a block diagram illustrating an example computing device, according to some embodiments.

Referring now to FIG. 6, a block diagram illustrating an example embodiment of a device 600 is shown. In some embodiments, elements of device 600 may be included within a system on a chip. In some embodiments, device 600 may be included in a mobile device, which may be battery-powered. Therefore, power consumption by device 600 may be an important design consideration. In the illustrated embodiment, device 600 includes fabric 610, compute complex 620 input/output (I/O) bridge 650, cache/memory controller 645, graphics unit 675, and display unit 665. In some embodiments, device 600 may include other components (not shown) in addition to or in place of the illustrated components, such as video processor encoders and decoders, image processing or recognition elements, computer vision elements, etc.

Fabric 610 may include various interconnects, buses, MUX's, controllers, etc., and may be configured to facilitate communication between various elements of device 600. In some embodiments, portions of fabric 610 may be configured to implement various different communication protocols. In other embodiments, fabric 610 may implement a single communication protocol and elements coupled to fabric 610 may convert from the single communication protocol to other communication protocols internally.

In the illustrated embodiment, compute complex 620 includes bus interface unit (BIU) 625, cache 630, and cores 635 and 640. In various embodiments, compute complex 620 may include various numbers of processors, processor cores and caches. For example, compute complex 620 may include 1, 2, or 4 processor cores, or any other suitable number. In one embodiment, cache 630 is a set associative L2 cache. In some embodiments, cores 635 and 640 may include internal instruction and data caches. In some embodiments, a coherency unit (not shown) in fabric 610, cache 630, or elsewhere in device 600 may be configured to maintain coherency between various caches of device 600. BIU 625 may be configured to manage communication between compute complex 620 and other elements of device 600. Processor cores such as cores 635 and 640 may be configured to execute instructions of a particular instruction set architecture (ISA) which may include operating system instructions and user application instructions. These instructions may be stored in computer readable medium such as a memory coupled to memory controller 645 discussed below.

As used herein, the term "coupled to" may indicate one or more connections between elements, and a coupling may include intervening elements. For example, in FIG. 6, graphics unit 675 may be described as "coupled to" a memory through fabric 610 and cache/memory controller 645. In contrast, in the illustrated embodiment of FIG. 6, graphics unit 675 is "directly coupled" to fabric 610 because there are no intervening elements.

Cache/memory controller 645 may be configured to manage transfer of data between fabric 610 and one or more caches and memories. For example, cache/memory controller 645 may be coupled to an L3 cache, which may in turn be coupled to a system memory. In other embodiments, cache/memory controller 645 may be directly coupled to a memory. In some embodiments, cache/memory controller 645 may include one or more internal caches. Memory coupled to controller 645 may be any type of volatile memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR4, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit in a chip-on-chip configuration, a package-on-package configuration, or a multi-chip module configuration. Memory coupled to controller 645 may be any type of non-volatile memory such as NAND flash memory, NOR flash memory, nano RAM (NRAM), magneto-resistive RAM (MRAM), phase change RAM (PRAM), Racetrack memory, Memristor memory, etc. As noted above, this memory may store program instructions executable by compute complex 620 to cause the computing device to perform functionality described herein.

Graphics unit 675 may include one or more processors, e.g., one or more graphics processing units (GPUs). Graphics unit 675 may receive graphics-oriented instructions, such as OPENGL®, Metal®, or DIRECT3D® instructions, for example. Graphics unit 675 may execute specialized GPU instructions or perform other operations based on the received graphics-oriented instructions. Graphics unit 675 may generally be configured to process large blocks of data in parallel and may build images in a frame buffer for output to a display, which may be included in the device or may be a separate device. Graphics unit 675 may include transform, lighting, triangle, and rendering engines in one or more graphics processing pipelines. Graphics unit 675 may output pixel information for display images. Graphics unit 675, in various embodiments, may include programmable shader circuitry which may include highly parallel execution cores configured to execute graphics programs, which may include pixel tasks, vertex tasks, and compute tasks (which may or may not be graphics-related).

In some embodiments, graphics unit 675 includes texture processor circuitry configured to implement disclosed point sampling techniques. This may improve performance, reduce power consumption, or both for GPU workloads that include point samples.

Display unit 665 may be configured to read data from a frame buffer and provide a stream of pixel values for display. Display unit 665 may be configured as a display pipeline in some embodiments. Additionally, display unit 665 may be configured to blend multiple frames to produce an output frame. Further, display unit 665 may include one or more interfaces (e.g., MIPI® or embedded display port (eDP)) for coupling to a user display (e.g., a touchscreen or an external display).

I/O bridge 650 may include various elements configured to implement: universal serial bus (USB) communications, security, audio, and low-power always-on functionality, for example. I/O bridge 650 may also include interfaces such as pulse-width modulation (PWM), general-purpose input/output (GPIO), serial peripheral interface (SPI), and inter-integrated circuit (I2C), for example. Various types of peripherals and devices may be coupled to device 600 via I/O bridge 650.

In some embodiments, device 600 includes network interface circuitry (not explicitly shown), which may be connected to fabric 610 or I/O bridge 650. The network interface circuitry may be configured to communicate via various networks, which may be wired, wireless, or both. For example, the network interface circuitry may be configured to communicate via a wired local area network, a wireless local area network (e.g., via Wi-Fi™), or a wide area network (e.g., the Internet or a virtual private network). In some embodiments, the network interface circuitry is configured to communicate via one or more cellular networks that use one or more radio access technologies. In some embodiments, the network interface circuitry is configured to communicate using device-to-device communications (e.g., Bluetooth® or Wi-Fi™ Direct), etc. In various embodiments, the network interface circuitry may provide device 600 with connectivity to various types of other devices and networks.

Example Applications

Figure 7:
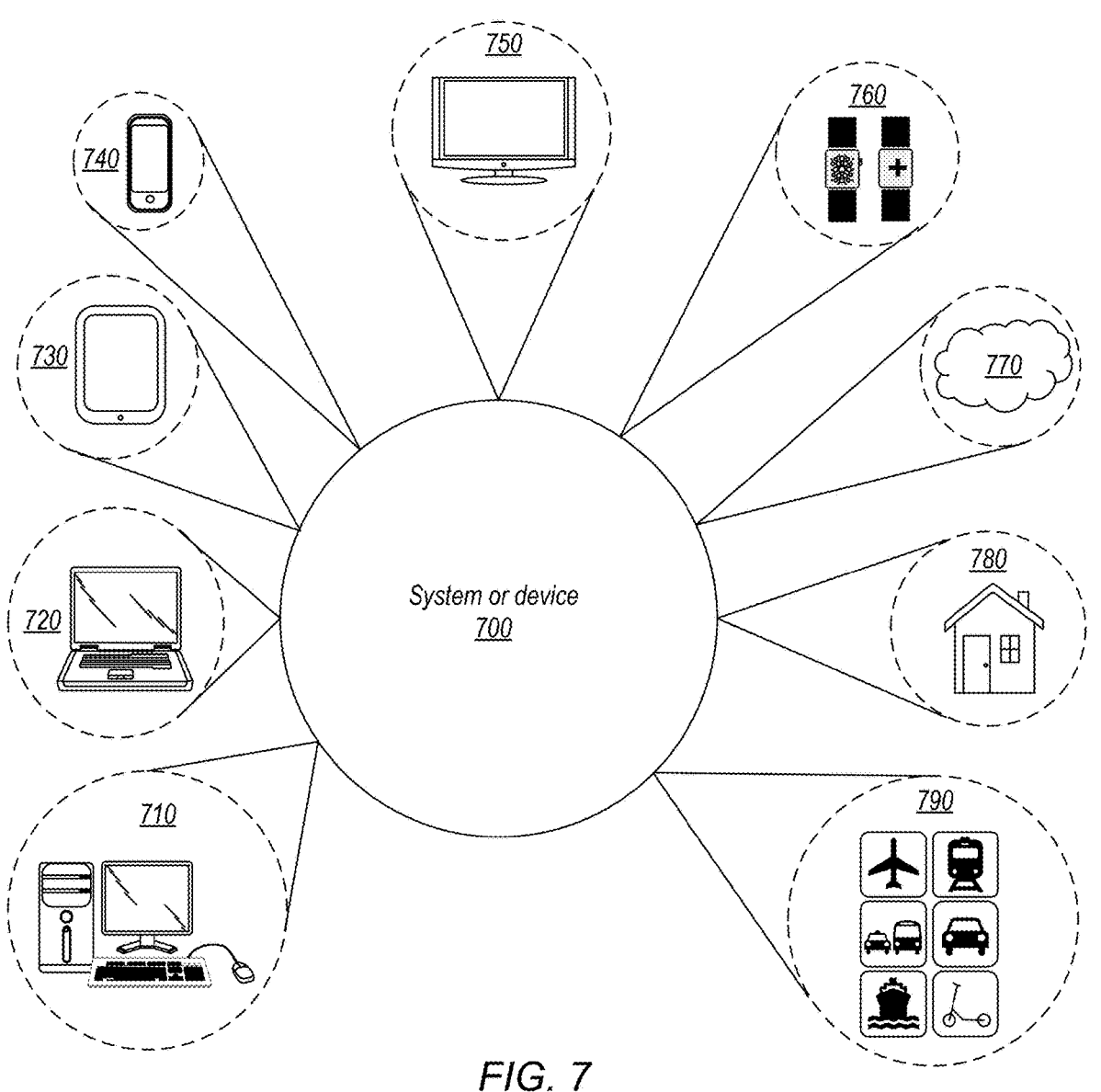
FIG. 7 is a diagram illustrating example applications of disclosed systems and devices, according to some embodiments.

Turning now to FIG. 7, various types of systems that may include any of the circuits, devices, or system discussed above. System or device 700, which may incorporate or otherwise utilize one or more of the techniques described herein, may be utilized in a wide range of areas. For example, system or device 700 may be utilized as part of the hardware of systems such as a desktop computer 710, laptop computer 720, tablet computer 730, cellular or mobile phone 740, or television 750 (or set-top box coupled to a television).

Similarly, disclosed elements may be utilized in a wearable device 760, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 700 may also be used in various other contexts. For example, system or device 700 may be utilized in the context of a server computer system, such as a dedicated server or on shared hardware that implements a cloud-based service 770. Still further, system or device 700 may be implemented in a wide range of specialized everyday devices, including devices 780 commonly found in the home such as refrigerators, thermostats, security cameras, etc. The interconnection of such devices is often referred to as the "Internet of Things" (IoT). Elements may also be implemented in various modes of transportation. For example, system or device 700 could be employed in the control systems, guidance systems, entertainment systems, etc. of various types of vehicles 790.

The applications illustrated in FIG. 7 are merely exemplary and are not intended to limit the potential future applications of disclosed systems or devices. Other example applications include, without limitation: portable gaming devices, music players, data storage devices, unmanned aerial vehicles, etc.

Example Computer-Readable Medium

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that programs a computing system to generate a simulation model of the hardware circuit, programs a fabrication system configured to produce hardware (e.g., an integrated circuit) that includes the disclosed circuitry, etc. Claims to such a storage medium are intended to cover, for example, an entity that produces a circuit design, but does not itself perform complete operations such as: design simulation, design synthesis, circuit fabrication, etc.

Figure 8:
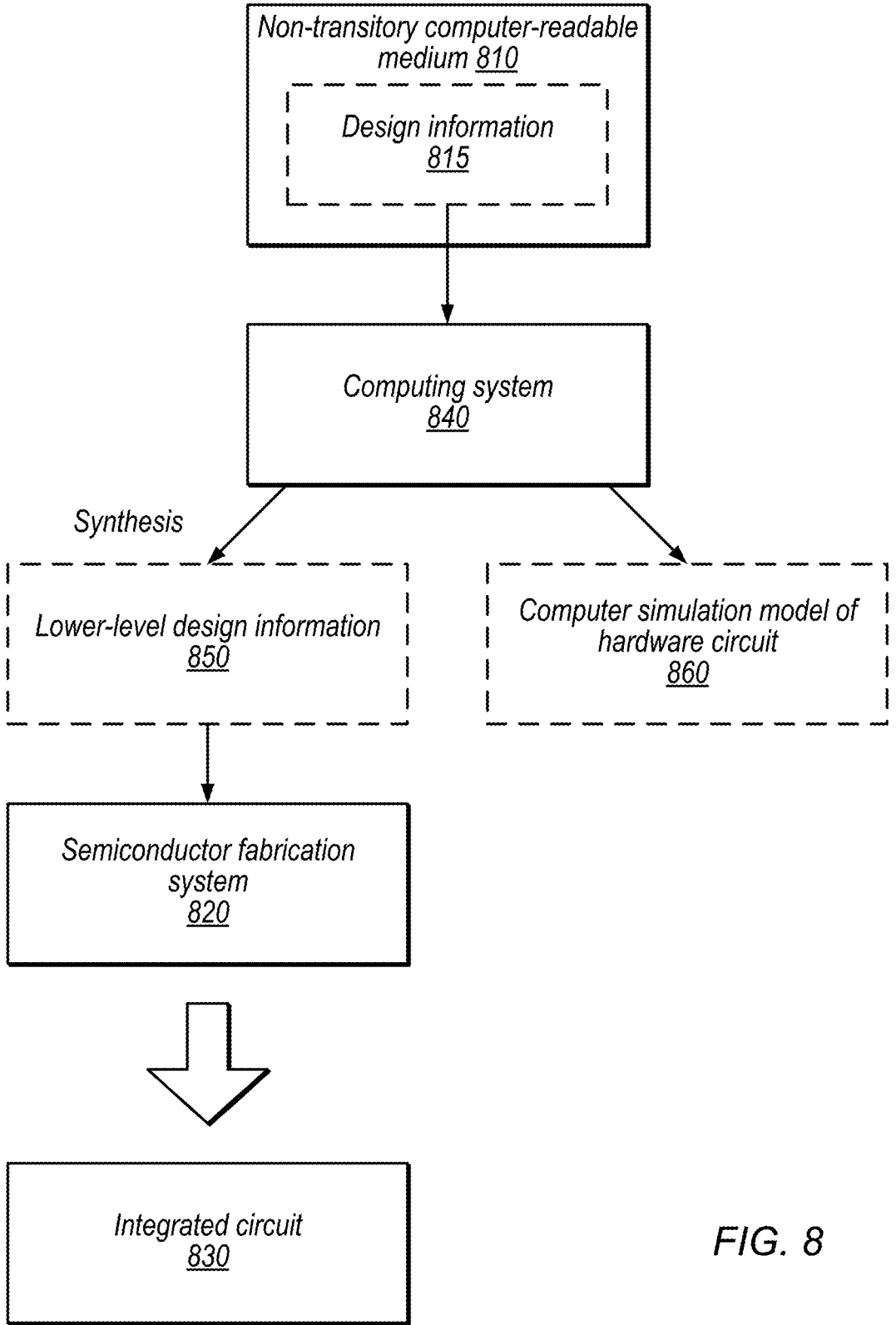
FIG. 8 is a block diagram illustrating an example computer-readable medium that stores circuit design information, according to some embodiments.

FIG. 8 is a block diagram illustrating an example non-transitory computer-readable storage medium that stores circuit design information, according to some embodiments. In the illustrated embodiment, computing system 840 is configured to process the design information. This may include executing instructions included in the design information, interpreting instructions included in the design information, compiling, transforming, or otherwise updating the design information, etc. Therefore, the design information controls computing system 840 (e.g., by programming computing system 840) to perform various operations discussed below, in some embodiments.

In the illustrated example, computing system 840 processes the design information to generate both a computer simulation model of a hardware circuit 860 and lower-level design information 850. In other embodiments, computing system 840 may generate only one of these outputs, may generate other outputs based on the design information, or both. Regarding the computing simulation, computing system 840 may execute instructions of a hardware description language that includes register transfer level (RTL) code, behavioral code, structural code, or some combination thereof. The simulation model may perform the functionality specified by the design information, facilitate verification of the functional correctness of the hardware design, generate power consumption estimates, generate timing estimates, etc.

In the illustrated example, computing system 840 also processes the design information to generate lower-level design information 850 (e.g., gate-level design information, a netlist, etc.). This may include synthesis operations, as shown, such as constructing a multi-level network, optimizing the network using technology-independent techniques, technology dependent techniques, or both, and outputting a network of gates (with potential constraints based on available gates in a technology library, sizing, delay, power, etc.). Based on lower-level design information 850 (potentially among other inputs), semiconductor fabrication system 820 is configured to fabricate an integrated circuit 830 (which may correspond to functionality of the simulation model 860). Note that computing system 840 may generate different simulation models based on design information at various levels of description, including information 850, 815, and so on. The data representing design information 850 and model 860 may be stored on medium 810 or on one or more other media.

In some embodiments, the lower-level design information 850 controls (e.g., programs) the semiconductor fabrication system 820 to fabricate the integrated circuit 830. Thus, when processed by the fabrication system, the design information may program the fabrication system to fabricate a circuit that includes various circuitry disclosed herein.

Non-transitory computer-readable storage medium 810, may comprise any of various appropriate types of memory devices or storage devices. Non-transitory computer-readable storage medium 810 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 810 may include other types of non-transitory memory as well or combinations thereof. Accordingly, non-transitory computer-readable storage medium 810 may include two or more memory media; such media may reside in different locations—for example, in different computer systems that are connected over a network.

Design information 815 may be specified using any of various appropriate computer languages, including hardware description languages such as, without limitation: VHDL, Verilog, SystemC, System Verilog, RHDL, M, MyHDL, etc. The format of various design information may be recognized by one or more applications executed by computing system 840, semiconductor fabrication system 820, or both. In some embodiments, design information may also include one or more cell libraries that specify the synthesis, layout, or both of integrated circuit 830. In some embodiments, the design information is specified in whole or in part in the form of a netlist that specifies cell library elements and their connectivity. Design information discussed herein, taken alone, may or may not include sufficient information for fabrication of a corresponding integrated circuit. For example, design information may specify the circuit elements to be fabricated but not their physical layout. In this case, design information may be combined with layout information to actually fabricate the specified circuitry.

Integrated circuit 830 may, in various embodiments, include one or more custom macrocells, such as memories, analog or mixed-signal circuits, and the like. In such cases, design information may include information related to included macrocells. Such information may include, without limitation, schematics capture database, mask design data, behavioral models, and device or transistor level netlists. Mask design data may be formatted according to graphic data system (GDSII), or any other suitable format.

Semiconductor fabrication system 820 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 820 may also be configured to perform various testing of fabricated circuits for correct operation.

In various embodiments, integrated circuit 830 and model 860 are configured to operate according to a circuit design specified by design information 815, which may include performing any of the functionality described herein. For example, integrated circuit 830 may include any of various elements shown in FIGS. 1B, 2-4, and 6. Further, integrated circuit 830 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components. Similarly, stating "instructions of a hardware description programming language" that are "executable" to program a computing system to generate a computer simulation model" does not imply that the instructions must be executed in order for the element to be met, but rather specifies characteristics of the instructions. Additional features relating to the model (or the circuit represented by the model) may similarly relate to characteristics of the instructions, in this context. Therefore, an entity that sells a computer-readable medium with instructions that satisfy recited characteristics may provide an infringing product, even if another entity actually executes the instructions on the medium.

Note that a given design, at least in the digital logic context, may be implemented using a multitude of different gate arrangements, circuit technologies, etc. As one example, different designs may select or connect gates based on design tradeoffs (e.g., to focus on power consumption, performance, circuit area, etc.). Further, different manufacturers may have proprietary libraries, gate designs, physical gate implementations, etc. Different entities may also use different tools to process design information at various layers (e.g., from behavioral specifications to physical layout of gates).

Once a digital logic design is specified, however, those skilled in the art need not perform substantial experimentation or research to determine those implementations. Rather, those of skill in the art understand procedures to reliably and predictably produce one or more circuit implementations that provide the function described by the design information. The different circuit implementations may affect the performance, area, power consumption, etc. of a given design (potentially with tradeoffs between different design goals), but the logical function does not vary among the different circuit implementations of the same circuit design.

In some embodiments, the instructions included in the design information instructions provide RTL information (or other higher-level design information) and are executable by the computing system to synthesize a gate-level netlist that represents the hardware circuit based on the RTL information as an input. Similarly, the instructions may provide behavioral information and be executable by the computing system to synthesize a netlist or other lower-level design information. The lower-level design information may program fabrication system 820 to fabricate integrated circuit 830.

The various techniques described herein may be performed by one or more computer programs. The term "program" is to be construed broadly to cover a sequence of instructions in a programming language that a computing device can execute. These programs may be written in any suitable computer language, including lower-level languages such as assembly and higher-level languages such as Python. The program may be written in a compiled language such as C or C++, or an interpreted language such as JavaScript.

Program instructions may be stored on a "computer-readable storage medium" or a "computer-readable medium" in order to facilitate execution of the program instructions by a computer system. Generally speaking, these phrases include any tangible or non-transitory storage or memory medium. The terms "tangible" and "non-transitory" are intended to exclude propagating electromagnetic signals, but not to otherwise limit the type of storage medium. Accordingly, the phrases "computer-readable storage medium" or a "computer-readable medium" are intended to cover types of storage devices that do not necessarily store information permanently (e.g., random access memory (RAM)). The term "non-transitory," accordingly, is a limitation on the nature of the medium itself (i.e., the medium cannot be a signal) as opposed to a limitation on data storage persistency of the medium (e.g., RAM vs. ROM).

The phrases "computer-readable storage medium" and "computer-readable medium" are intended to refer to both a storage medium within a computer system as well as a removable medium such as a CD-ROM, memory stick, or portable hard drive. The phrases cover any type of volatile memory within a computer system including DRAM, DDR RAM, SRAM, EDO RAM, Rambus RAM, etc., as well as non-volatile memory such as magnetic media, e.g., a hard drive, or optical storage. The phrases are explicitly intended to cover the memory of a server that facilitates downloading of program instructions, the memories within any intermediate computer system involved in the download, as well as the memories of all destination computing devices. Still further, the phrases are intended to cover combinations of different types of memories.

In addition, a computer-readable medium or storage medium may be located in a first set of one or more computer systems in which the programs are executed, as well as in a second set of one or more computer systems which connect to the first set over a network. In the latter instance, the second set of computer systems may provide program instructions to the first set of computer systems for execution. In short, the phrases "computer-readable storage medium" and "computer-readable medium" may include two or more media that may reside in different locations, e.g., in different computers that are connected over a network.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation— [entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement of such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used to transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g., passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

The invention claimed is:

1. An apparatus, comprising:
processor circuitry configured to execute graphics programs;
multiple pipelines, wherein a given pipeline is configured to: vidually indicated to be incorporated by reference. In case of conflict, the present application, including any definitions herein, will control.

for a multi-texel sample operation specified by the processor circuitry, access texel data for multiple texels forming a first shape in a texture; and perform one or more filter operations to generate a result for the multi-texel sample operation;

point sample control circuitry configured to:

detect that multiple point sample operations, specified by the processor circuitry, access a set of texels having the first shape;

in response to the detection, assign the multiple point sample operations to one of the pipelines for performance in parallel by the pipeline; and provide results of the assigned multiple point sample operations to the processor circuitry.

2. The apparatus of claim 1, wherein a given pipeline includes multiple parallel sample pipelines configured to access texture data in parallel and filter circuitry configured to perform the one or more filter operations on results from the parallel sample pipelines.

3. The apparatus of claim 1, wherein:

the first shape is a 2×2 quad of pixels;

the one or more filter operations include a bilinear filter operation; and the point sample control circuitry is configured to assign four point sample operations to the one of the pipelines.

4. The apparatus of claim 1, wherein the first shape is a line of multiple adjacent pixels.

5. The apparatus of claim 1, wherein:

the first shape is a 4×4 group of pixels;

the one or more filter operations include a bicubic filter operation.

6. The apparatus of claim 1, wherein the point sample control circuitry is configured to disable filter circuitry of the one of the pipelines in conjunction with the assignment.

7. The apparatus of claim 1, wherein the point sample control circuitry is further configured to, for a different set of multiple point sample operations that do not access a set of texels having the first shape, assign the point sample operations of the different set to different pipelines.

8. The apparatus of claim 1, wherein:

a given pipeline is configured to exploit cache locality for texel data corresponding to the first shape.

9. The apparatus of claim 1, wherein:

the multiple point sample operations are from different threads executed by the processor circuitry; and the point sample control circuitry is configured to provide a given result of the assigned multiple point sample operations to the corresponding thread.

10. The apparatus of claim 1, wherein the point sample control circuitry is further configured to:

determine that a threshold number of point sample operations are included in an executed graphics program; and in response to the determination, power gate a proper subset of the multiple pipelines.

11. The apparatus of claim 1, wherein the point sample control circuitry is configured to assign the multiple point sample operations to one of the pipelines based on confirming one or more coalesce conditions, including:

a level of detail condition; and an anisotropic condition.

12. The apparatus of claim 1, wherein the apparatus is a computing device that further comprises:

a display;

a central processing unit; and a network interface.

13. A method, comprising:

accessing, by a pipeline of multiple pipelines included in a computing system for a multi-texel sample operation, texel data for multiple texels forming a first shape in a texture;

performing, by the computing system, one or more filter operations to generate a result for the multi-texel sample operation;

detecting, by the computing system, that that multiple point sample operations access a set of texels having the first shape;

in response to the detection, the computing system assigning the multiple point sample operations to one of the pipelines for performance in parallel by multiple sample pipelines of the pipeline; and providing, by the computing system, results of the assigned multiple point sample operations to shader processor circuitry of the computing system.

14. The method of claim 13, wherein:

the first shape is a 2×2 quad of pixels;

the one or more filter operations include a bilinear filter operation.

15. The method of claim 13, further comprising:

disabling, by the computing system, filter circuitry for processing of the multiple point sample operations.

16. The method of claim 13, further comprising:

performing, by the computing system, one or more swizzle operations on results of the assigned multiple point sample operations to exploit cache locality for texel data corresponding to the first shape.

17. The method of claim 13, further comprising:

determining, by the computing system, that a threshold number of point sample operations are included in an executed graphics program; and power gating, by the computing system in response to the determining, a proper subset of the multiple pipelines.

18. A non-transitory computer-readable medium having instructions of a hardware description programming language stored thereon that, when processed by a computing system, program the computing system to generate a computer simulation model, wherein the model represents a hardware circuit that includes:

processor circuitry configured to execute graphics programs;

multiple pipelines, wherein a given pipeline is configured to:

for a multi-texel sample operation specified by the processor circuitry, access texel data for multiple texels forming a first shape in a texture; and perform one or more filter operations to generate a result for the multi-texel sample operation;

point sample control circuitry configured to:

detect that multiple point sample operations, specified by the processor circuitry, access a set of texels having the first shape;

in response to the detection, assign the multiple point sample operations to one of the pipelines for performance in parallel by the pipeline; and provide results of the assigned multiple point sample operations to the processor circuitry.

19. The non-transitory computer-readable medium of claim 18, wherein a given pipeline includes multiple parallel sample pipelines configured to access texture data in parallel and filter circuitry configured to perform the one or more filter operations on results from the parallel sample pipelines.

20. The non-transitory computer-readable medium of claim 18, wherein the point sample control circuitry is configured to disable filter circuitry of the one of the pipelines in conjunction with the assignment.

* * * * *